(12) United States Patent
Kenin

(10) Patent No.: US 11,898,778 B2
(45) Date of Patent: Feb. 13, 2024

(54) PASSIVE RETROFIT SOLAR THERMAL CLADDING STRUCTURE

(71) Applicant: Stephen Kenin, Taos, NM (US)

(72) Inventor: Stephen Kenin, Taos, NM (US)

(*) Notice: Subject to any disclaimer, the term of this patent is extended or adjusted under 35 U.S.C. 154(b) by 391 days.

(21) Appl. No.: 17/368,328

(22) Filed: Jul. 6, 2021

(65) Prior Publication Data

US 2022/0003457 A1 Jan. 6, 2022

Related U.S. Application Data

(60) Provisional application No. 63/048,247, filed on Jul. 6, 2020.

(51) Int. Cl.
| | |
|---|---|
| *F24S 20/61* | (2018.01) |
| *F24D 5/00* | (2022.01) |
| *F24S 70/60* | (2018.01) |
| *F24S 20/00* | (2018.01) |
| *F24S 25/00* | (2018.01) |

(52) U.S. Cl.
CPC .......... *F24S 20/61* (2018.05); *F24D 5/005* (2013.01); *F24S 70/60* (2018.05); *F24D 2200/14* (2013.01); *F24S 2020/18* (2018.05); *F24S 2025/806* (2018.05); *F24S 2070/62* (2018.05)

(58) Field of Classification Search
None
See application file for complete search history.

(56) References Cited

U.S. PATENT DOCUMENTS

| | | | |
|---|---|---|---|
| 4,160,523 A * | 7/1979 | Stevens | F24S 10/72 126/400 |
| D270,764 S | 9/1983 | Kenin | |
| 5,095,677 A * | 3/1992 | Godbout | F16B 12/32 403/176 |
| 5,566,512 A * | 10/1996 | Page | E04H 15/22 52/2.16 |
| 5,675,938 A * | 10/1997 | McLorg | F24F 13/22 47/29.1 |
| 7,481,234 B1 * | 1/2009 | Gustafson | E04H 15/425 135/156 |
| 2009/0084043 A1* | 4/2009 | Tarbet | E04H 15/20 52/741.1 |
| 2009/0320380 A1* | 12/2009 | Chelf | A01G 9/1407 454/239 |
| 2019/0003200 A1* | 1/2019 | Ming | E04H 4/105 |
| 2019/0032331 A1* | 1/2019 | von Gonten | E04B 1/1906 |

OTHER PUBLICATIONS

Solar Resources, Inc., Solar Room Heat Machine/Screen Porch, 1981, 10 pages.

* cited by examiner

*Primary Examiner* — David J Laux
(74) *Attorney, Agent, or Firm* — Kinney & Lange, P.A.

(57) ABSTRACT

A solar thermal cladding structure includes a frame, a membrane extending along the frame, the membrane having a first layer and a second layer, and an inflation blower connected to the membrane and in fluid communication with a space between the first layer and the second layer of the membrane. The frame includes a plurality of connectors and a plurality of beam struts. The plurality of connectors connect the plurality of beam struts together.

15 Claims, 20 Drawing Sheets

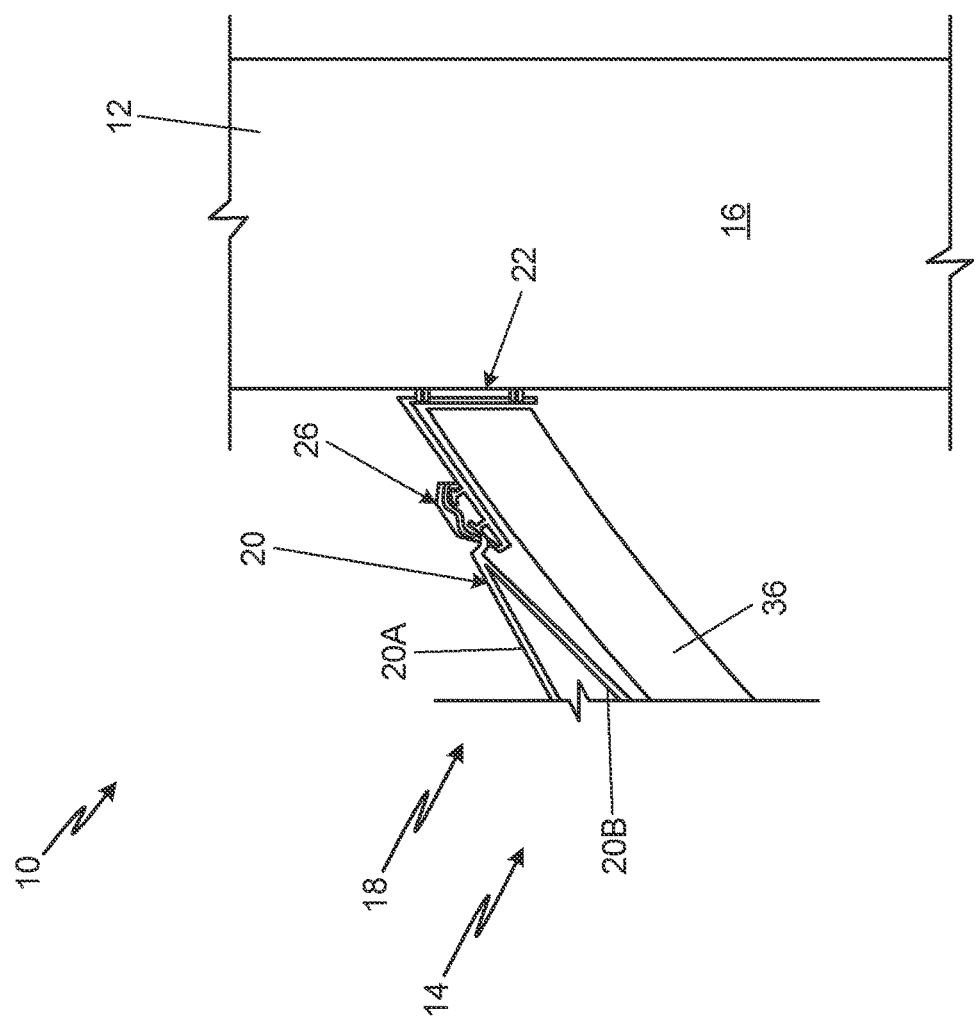

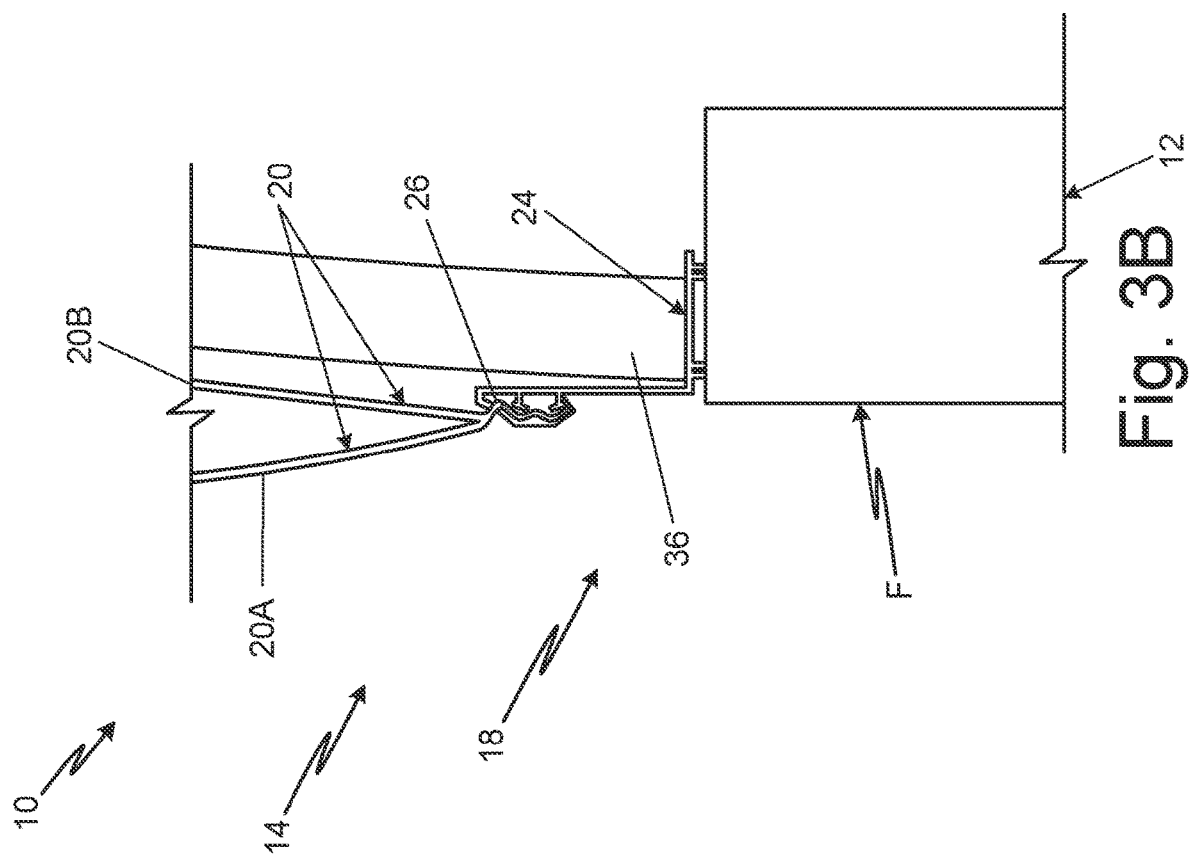

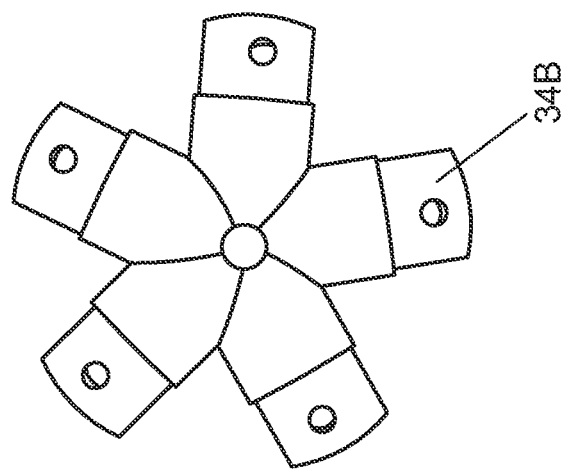
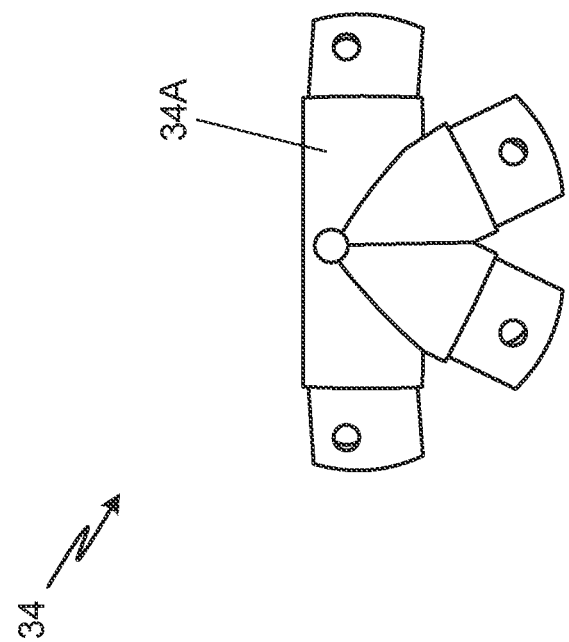
Fig. 4

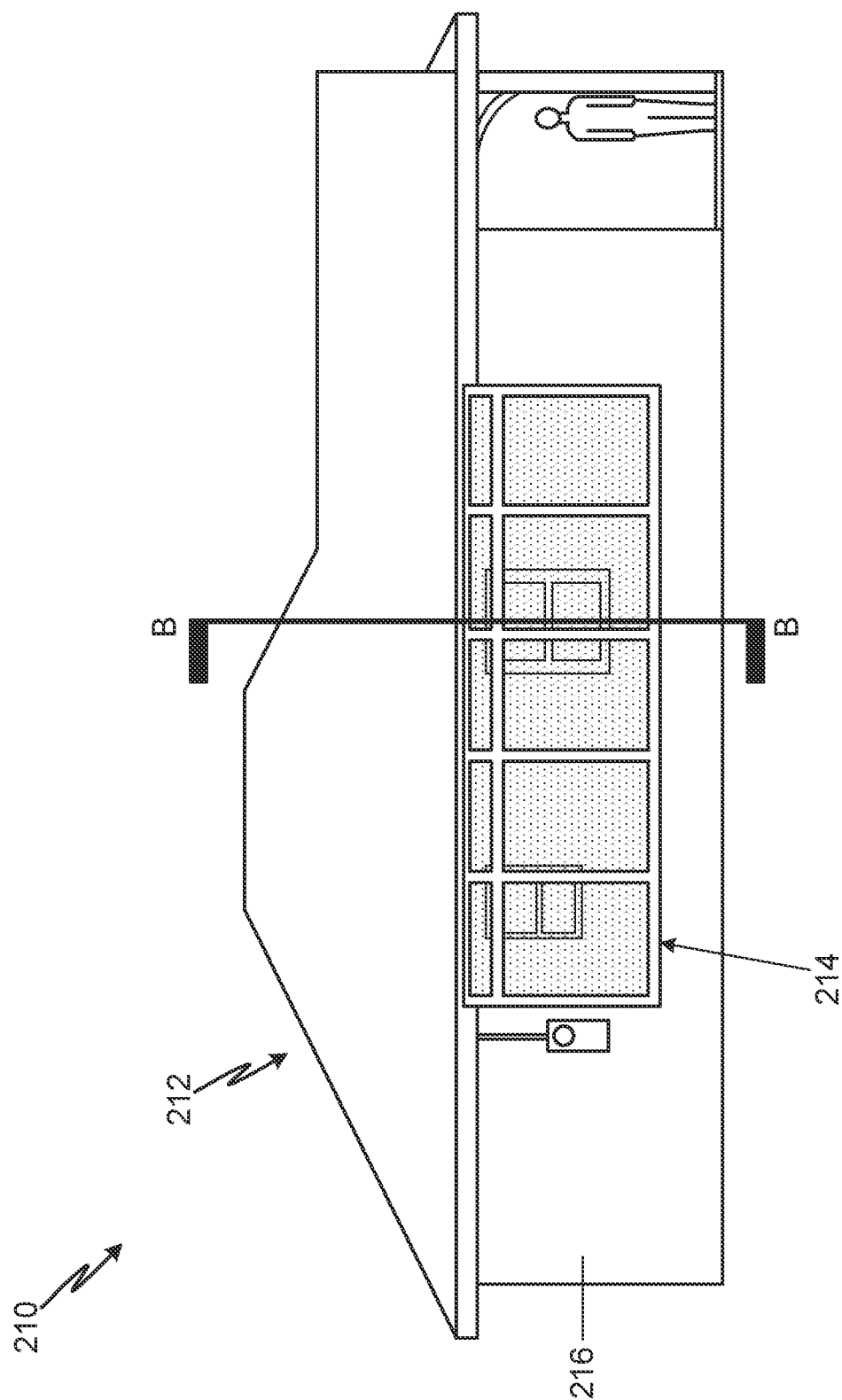

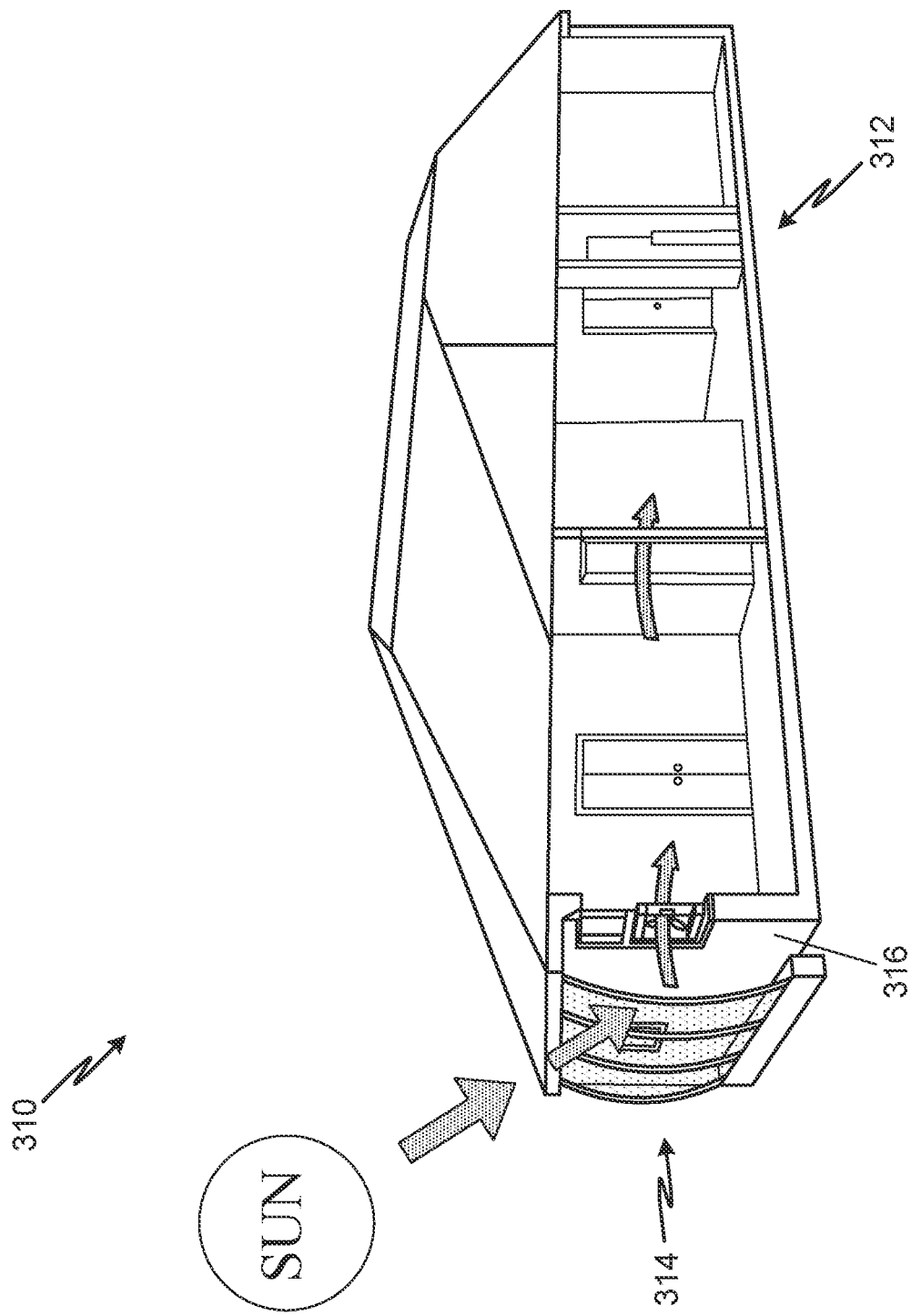

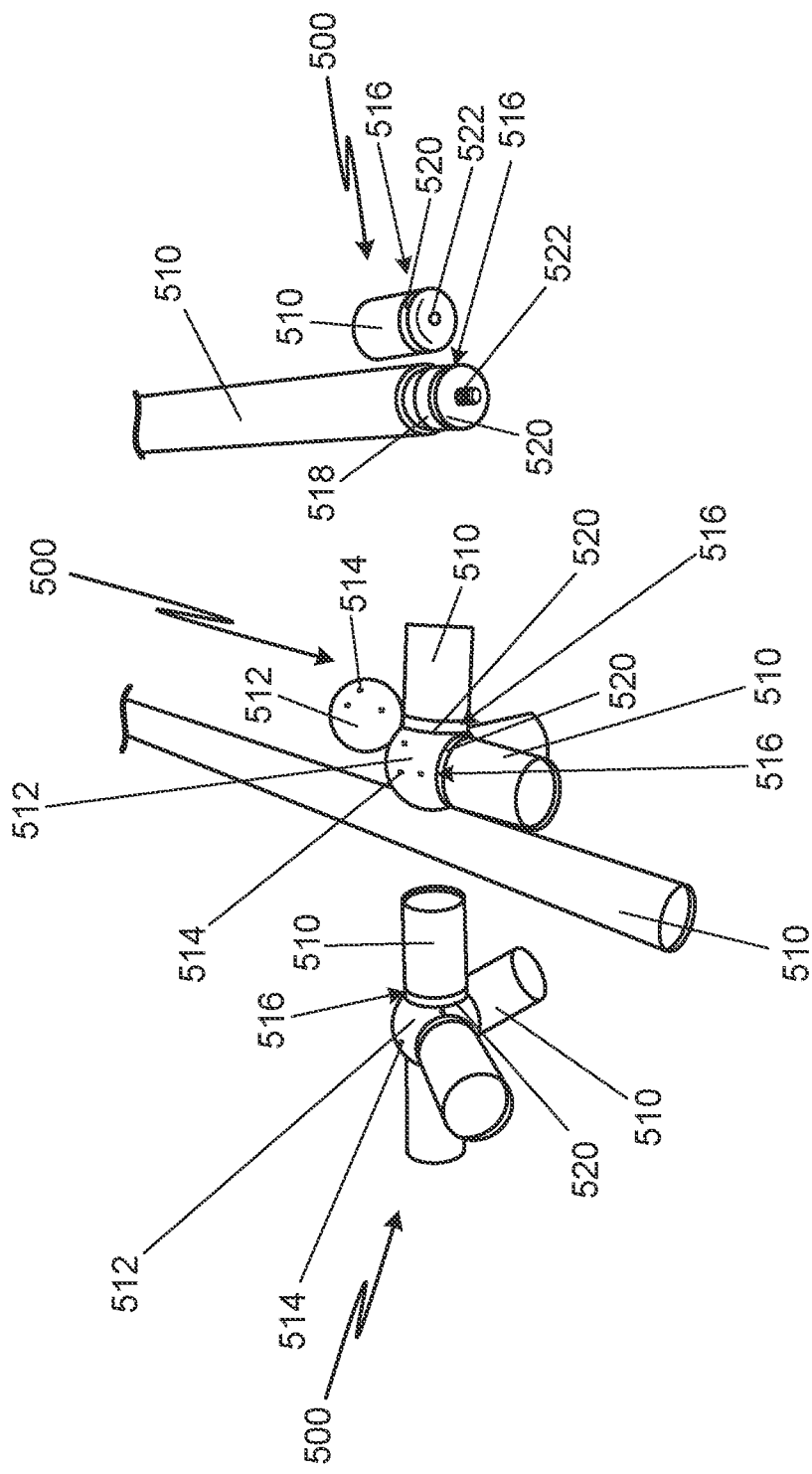

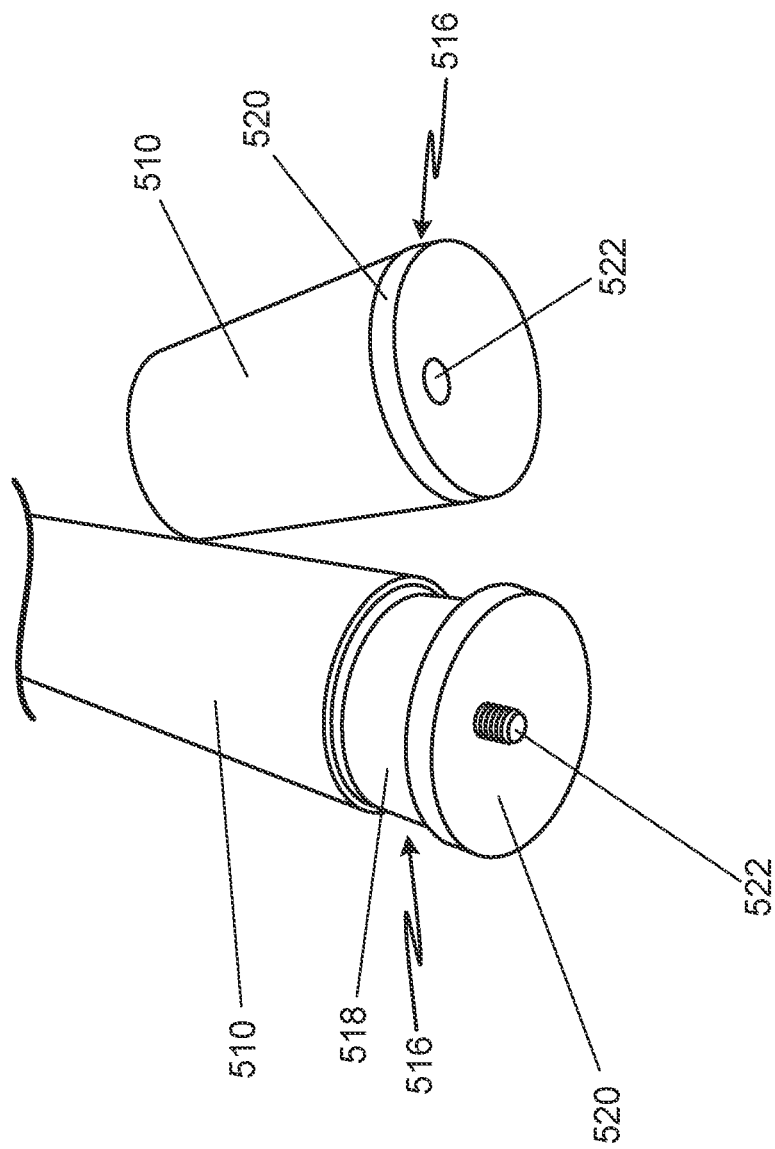

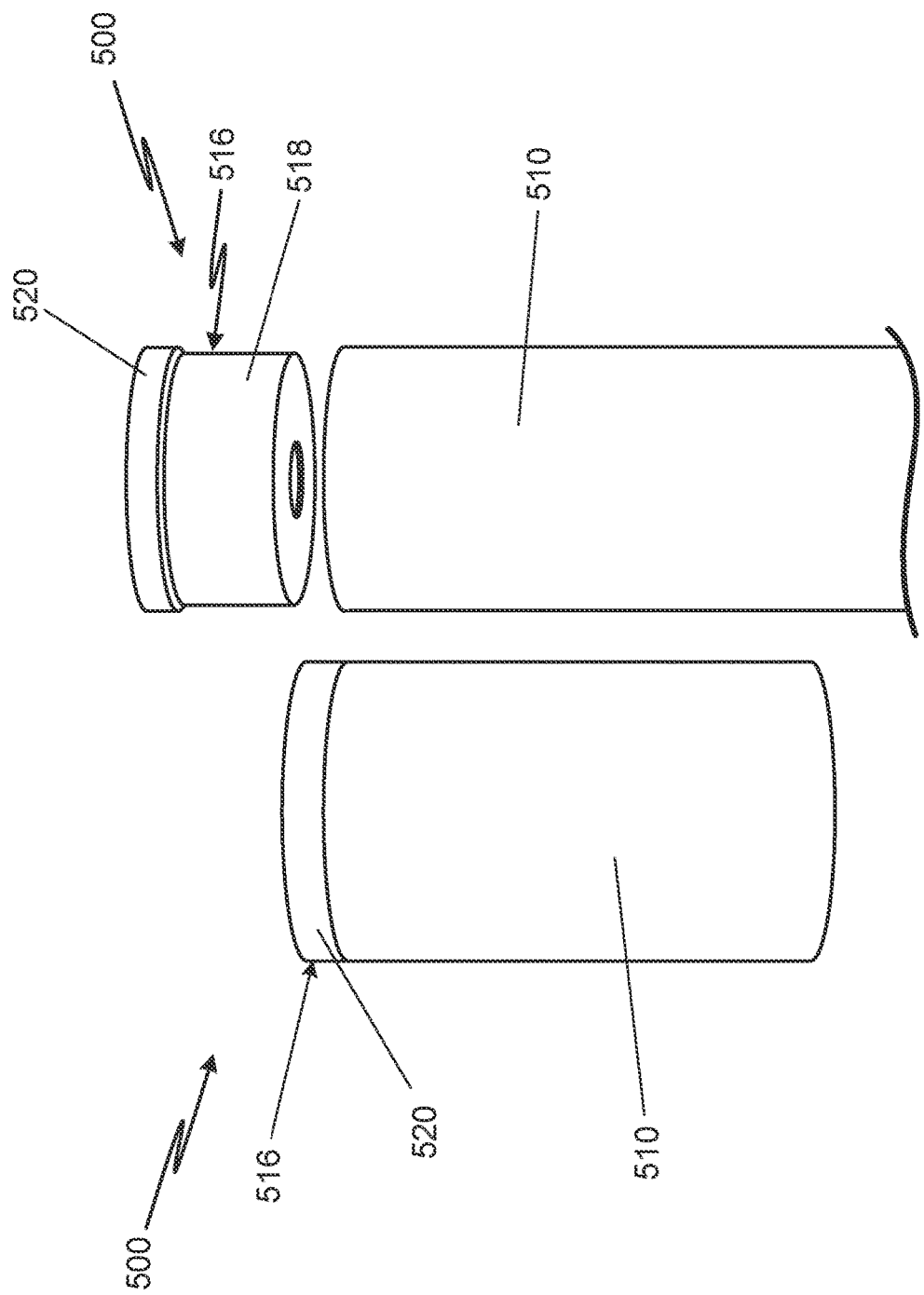

PASSIVE RETROFIT SOLAR THERMAL CLADDING STRUCTURE

CROSS-REFERENCE TO RELATED APPLICATION(S)

This application claims the benefit of U.S. Provisional Application No. 63/048,247 filed Jul. 6, 2020 for "PASSIVE RETROFIT SOLAR THERMAL CLADDING STRUCTURE" by Stephen Kenin, which is fully incorporated by reference herein.

BACKGROUND

The present disclosure relates generally to heating systems, and in particular, to solar-powered heating systems.

Traditional heating systems use fossil fuels, such as natural gas, to provide heat to homes and buildings. Fossil fuels produce carbon dioxide as they are burned. While natural gas is a cleaner fossil fuel, natural gas emits about 117 pounds of carbon dioxide per one million BTUs. As such, fossil fuels, including natural gas, contribute to greenhouse gas emissions. A heating system that does not utilize fossil fuels would be advantageous.

SUMMARY

A solar thermal cladding structure includes a frame, a membrane extending along the frame, the membrane having a first layer and a second layer, and an inflation blower connected to the membrane and in fluid communication with a space between the first layer and the second layer of the membrane. The frame includes a plurality of connectors and a plurality of beam struts. The plurality of connectors connect the plurality of beam struts together.

A solar thermal cladding structure includes a frame, a membrane extending along the frame, the membrane having a first layer and a second layer, and an inflation blower connected to the membrane and in fluid communication with a space between the first layer and the second layer of the membrane. The solar thermal cladding structure is configured to mount to a house or building at an exterior wall or roof that is exposed to direct sunlight and to collect solar thermal radiation to heat the house or building.

BRIEF DESCRIPTION OF THE DRAWINGS

FIG. 3A is an enlarged partial view of the heating system showing an upper portion of a frame of the solar thermal cladding structure attached to an exterior wall of the house.

FIG. 3B is an enlarged partial view of the heating system showing a lower portion of the frame of the solar thermal cladding structure attached to a foundation of the house.

FIG. 4 is a top view of connectors that can be used to connect beam struts to form the frame of the solar thermal cladding structure.

FIG. 6A is an elevation view of a heating system of a house with a solar thermal cladding structure mounted on an exterior wall of the house.

FIG. 7B is sectional perspective view of the heating system of the house and the solar thermal cladding structure of FIG. 7A.

FIG. 9A is a perspective view of connectors that are used to connect beam struts together.

FIG. 9B is a perspective top view of inserts of the connectors that are used to connect beam struts together.

FIG. 9C is a perspective bottom view of the inserts of the connectors that are used to connect beam struts together.

DETAILED DESCRIPTION

In general, the present disclosure describes a solar thermal cladding structure that includes a double-layered membrane extending over a frame made of beam struts connected together via connectors. The solar thermal cladding structure is mounted to a house or building and uses solar energy to provide heat to the house or building, resulting in reduced natural gas consumption and carbon dioxide emissions generated from heating processes.

Figure 1A:
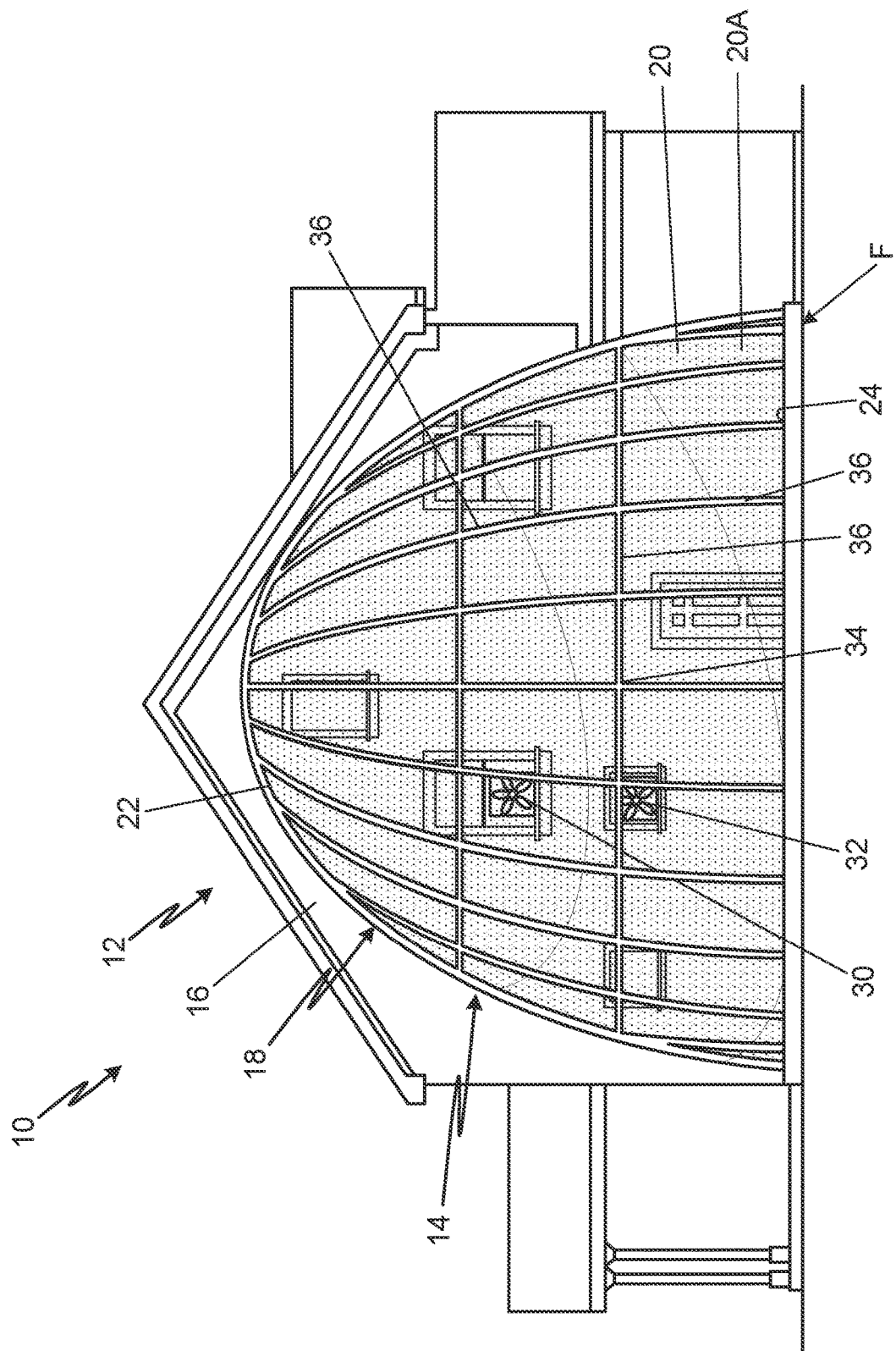
FIG. 1A is an elevation view of a heating system of a two-story house with a solar thermal cladding structure mounted on an exterior wall of the house.
Figure 1B:
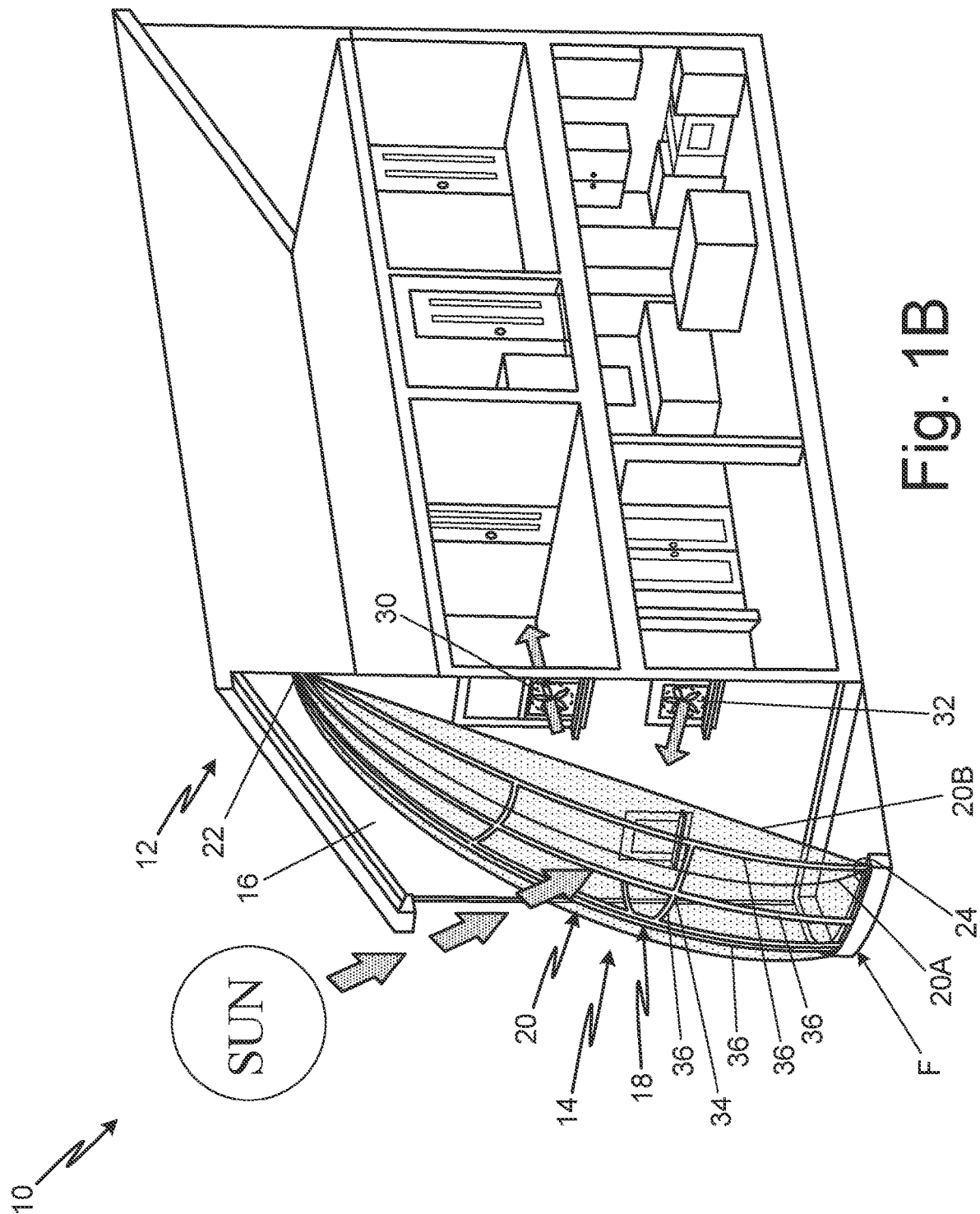
FIG. 1B is a sectional perspective view of the heating system of the house and the solar thermal cladding structure of FIG. 1A.
Figure 2:
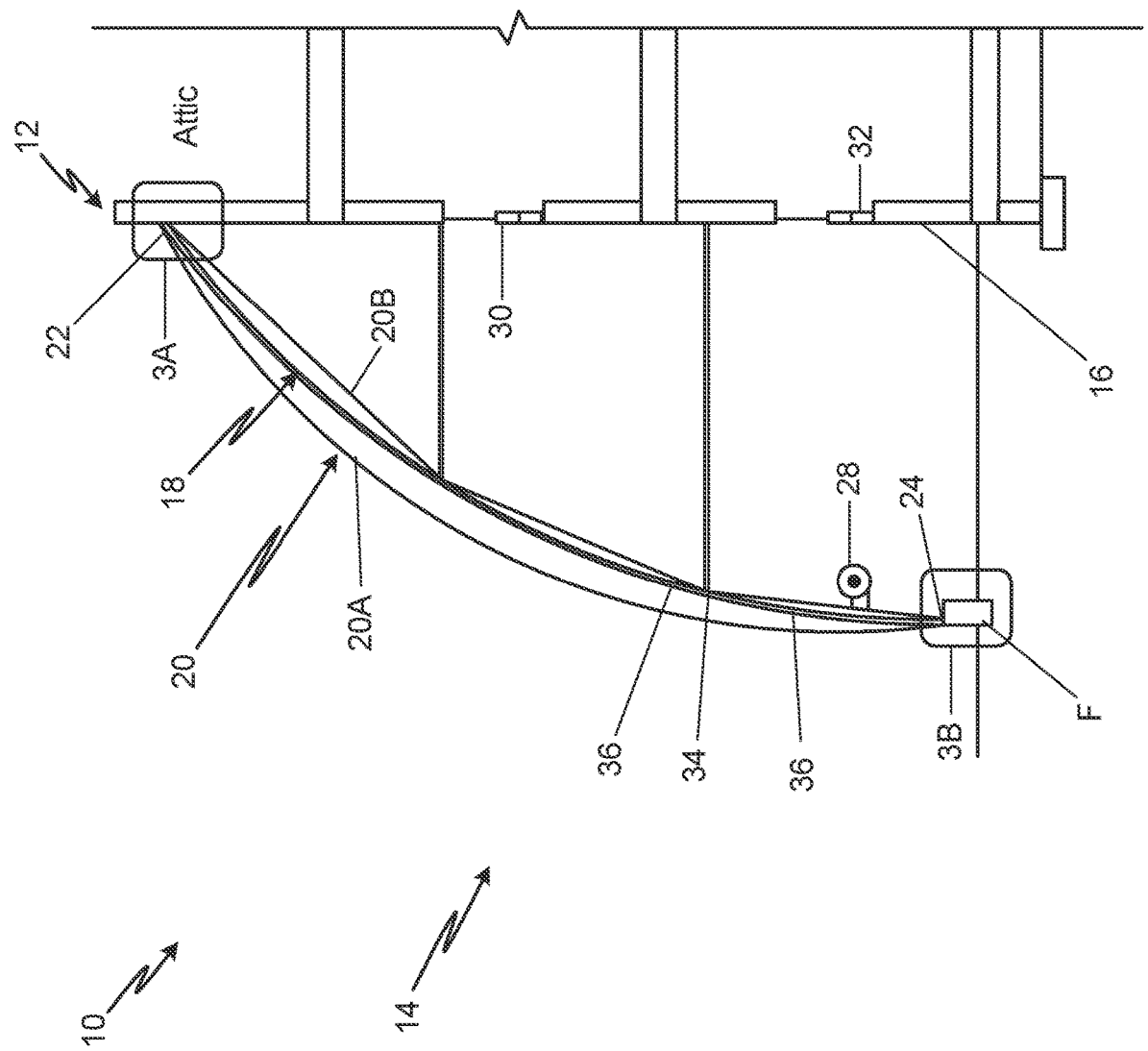
FIG. 2 is a partial cross-sectional view of the heating system of the house and the solar thermal cladding structure.

FIG. 1A is an elevation view of heating system 10 of two-story house 12 with solar thermal cladding structure 14 mounted on exterior wall 16 of house 12. FIG. 1B is a sectional perspective view of heating system 10 of house 12 and solar thermal cladding structure 14 of FIG. 1A. FIG. 2 is a partial cross-sectional view of heating system 10 of house 12 and solar thermal cladding structure 14. FIG. 3A is an enlarged partial view of heating system 10 showing an upper portion of frame 18 of solar thermal cladding structure 14 attached to exterior wall 16 of house 12. FIG. 3B is an enlarged partial view of heating system 10 showing a lower portion of frame 18 of solar thermal cladding structure 14 attached to foundation F of house 12. FIG. 4 is a top view of connectors 34 that can be used to connect beam struts 36 to form frame 18 of solar thermal cladding structure 14. FIGS. 1A-4 will be discussed together.

Heating system 10 includes house 12 and solar thermal cladding structure 14. House 12 includes exterior wall 16 and foundation F. Solar thermal cladding structure 14 includes frame 18, membrane 20 (including first layer 20A and second layer 20B), perimeter frame upper locking extrusion 22, perimeter frame lower locking extrusion 24, membrane locking inserts 26, inflation blower 28 (shown in FIG. 2), supply fan 30, and return fan 32. Frame 18 includes connectors 34 (such as straight connector 34A and strut connector 34B) and beam struts 36.

Heating system 10 is a heating system for a house, such as two-story house 12, as shown in FIGS. 1A and 1B, that utilizes solar thermal cladding structure 14. House 10 has exterior wall 16 on a side of house 10. Exterior wall 16 is a "sunny wall" that is located so that it will be exposed to direct sunlight during a substantial period of time during a day. Solar thermal cladding structure 14 is connected to exterior wall 16 and foundation F of house 10. Foundation F may be treated wood beam or concrete foundation. Solar thermal cladding structure 14 has frame 18 for supporting double-layered membrane 20. Membrane 20 extends along frame 18. Membrane 20 has a first layer 20A and a second layer 20B such that membrane 20 is double-layered and a space is formed within membrane 20. First layer 20A is an inner layer, and second layer 20B is an outer layer. First layer 20A and second layer 20B that make up membrane 20 are each highly transmissive translucent or transparent solar membranes. First layer 20A and second layer 20B may be made of translucent polyethylene, clear ethylene tetrafluoroethylene (ETFE), or any other suitable material.

Perimeter frame upper locking extrusion 22 is connected to an upper portion of the perimeter of membrane 20, an upper portion of frame 18, and exterior wall 16. Perimeter frame lower locking extrusion 24 is connected to a lower portion of the perimeter of membrane 20, a lower portion of frame 18, and foundation F. Perimeter frame upper locking extrusion 22 and perimeter frame lower locking extrusion 24 each couple with a membrane locking insert 26 to connect membrane 20 to perimeter frame upper locking extrusion 22 and perimeter frame lower locking extrusion 24. Inflation blower 28 is attached to inner second layer 20B of membrane 20. Inflation blower 28 may be, a 30-watt electric blower, a 40-watt electric blower, or any other suitable inflation device. Inflation blower 28 is in fluid communication with the space between first layer 20A and second layer 20B of membrane 20. Supply fan 24 is in fluid communication with house 10 such that it moves airflow from an exterior of house 10 at exterior wall 14 adjacent solar thermal cladding structure 14 into an interior of house 10. Return fan 32 is in fluid communication with house 10 such that it moves airflow from an interior of house 10 to an exterior of house 10 at exterior wall 14 adjacent solar thermal cladding structure 14.

Frame 18 has a plurality of connectors 34 to connect a plurality of beam struts 36 together. Straight connector 34A has four cylindrical openings shaped to form a flat section. Strut connector 34B has five equally spaced apart cylindrical openings. Each opening of connectors 34 is sized and shaped to have an interference fit with a beam strut 36. Any number of straight connectors 34A and/or strut connectors 34B may be used to form frame 18 depending on the desired shape of frame 18. Beam struts 36 are tubular anodized aluminum beam struts that are joined together by connectors 34. Beam struts 36 may be schedule 40 extruded aluminum and may have 2-inch diameters. As such, each beam strut 36 is joined to a connector 34 on both ends of beam strut 36. The lengths of beam struts 36 can vary, and connectors 34 can take a variety of different configurations to allow a wide variety of different shapes and sizes of frames. Using short straight beam struts 36 and connectors that provide an angled join allows curved horizontal and vertical structures of frame 18 to be formed.

Frame 18 is constructed using tubular beam struts 36 that are joined together by connectors 34. In forming solar thermal cladding structure 14 and connecting solar thermal cladding structure 14 to house 12, three beam strut 36 are joined together, and their ends are bolted to perimeter frame upper locking extrusion 22 and perimeter frame lower locking extrusion 24. First layer 20A and second layer 20B of membrane 20 are stretched over the beam struts 36 of frame 16 and locked into perimeter frame upper locking extrusion 22 and perimeter frame lower locking extrusion 24 using membrane locking inserts 26. Excess membrane material is trimmed off. As such, perimeter frame upper locking extrusion 22 connects a perimeter of membrane 20 to an upper portion of frame 18 at exterior wall 16, and perimeter frame lower locking extrusion 24 connects a perimeter of membrane 20 to a lower portion of frame 18 at foundation F. Perimeter frame upper locking extrusion 22 and perimeter frame lower locking extrusion 24 hold and seal membrane 20 to house 12. Inflation blower 28 inflates membrane 20 by inserting air into the space between first layer 20A and second layer 20B, creating a bubble having a robust tension structure.

Thermal cladding structure 14 collects solar thermal radiation and circulates the heated air into the interior of house 10. Membrane 20 is the glazing and exterior sunny wall 16 is the solar absorber surface of the solar collection system formed by solar thermal cladding structure 14. Heated air radiating off sunny exterior wall 16 is circulated through windows and doors of house 10 by thermostatically controlled window supply fan 30 and return fan 32, or by the HVAC system ductwork of house 10, when appropriate. For example, 80 degrees Fahrenheit solar-heated air is circulated by window supply fan 30 and return fan 32. Doors within house 10 can be kept ajar to promote the flow of heated air throughout house 10.

Figure 5A:
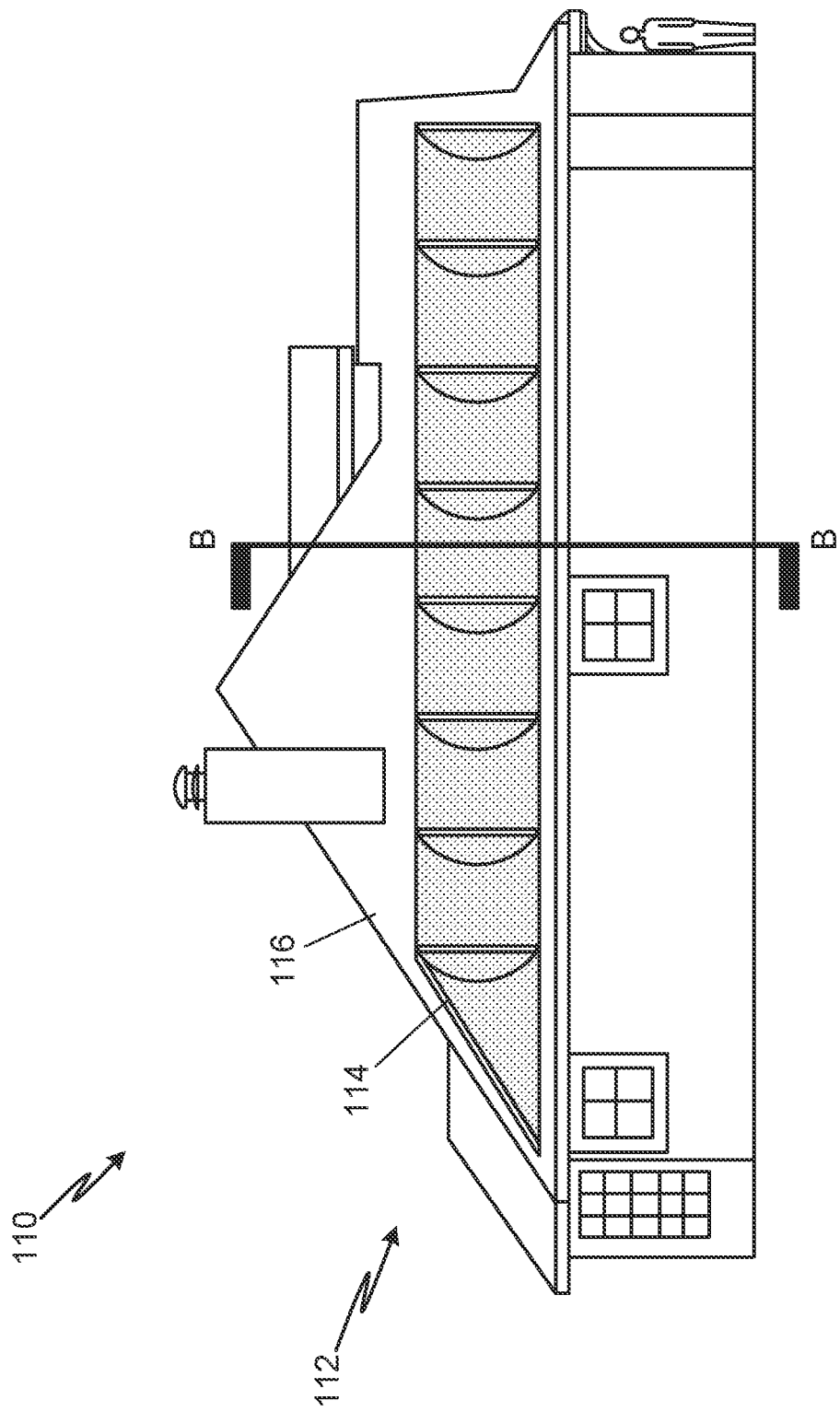
FIG. 5A is an elevation view of a heating system of a one-story house with a solar thermal cladding structure mounted on a sunny side of the roof of the house.
Figure 5B:
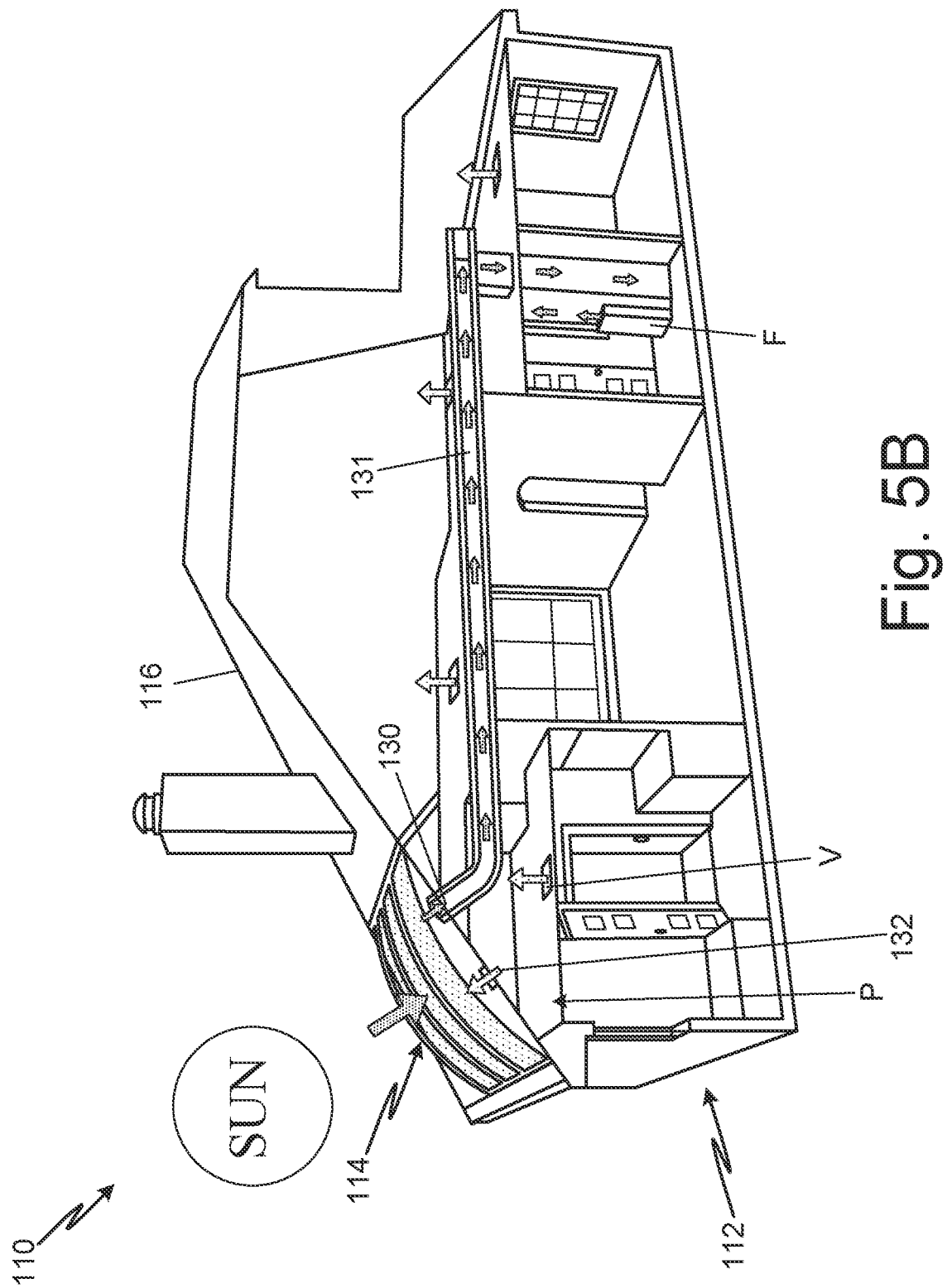
FIG. 5B is sectional perspective view of the heating system of the house and the solar thermal cladding structure of FIG. 5A.

FIG. 5A is an elevation view of heating system 110 of house 112 with solar thermal cladding structure 114 mounted on sunny side of the roof 116 of house 112. FIG. 5B is sectional perspective view of heating system 110 of house 112 and solar thermal cladding structure 114 of FIG. 5A. Heating system 110 includes house 112 and solar thermal cladding structure 114. House 112 includes sunny side of the roof 116. Solar thermal cladding structure 114 includes supply vent 130, supply ductwork 131, and return vent 132.

Heating system 110 has the same structure and function as heating system 10 described with respect to FIGS. 1A-4. However, heating system 110 has one-story house 112 and solar thermal cladding structure 114 is mounted to sunny side of the roof 116 such that solar thermal cladding structure 114 utilizes supply vent 130, supply ductwork 131, and return vent 132. Solar thermal cladding structure 114 is in fluid communication with supply vent 130, which is in fluid communication with supply ductwork 131. Return vent 132 is also in fluid communication with solar thermal cladding structure 114.

Solar thermal cladding structure 114 creates a passive solar cladding bubble on sunny side of the roof 116 that collects heat that can be used to heat house 112. Solar thermal cladding structure 114 collects solar thermal radiation and circulates the heated air into furnace F of house 112. Solar heated air passes from solar thermal cladding structure 114 through supply vent 130 into supply ductwork 131, which delivers the heated air to furnace F. The heated air passes through furnace F and is distributed throughout house 112 through the HVAC ductwork in house 112. Cooler air returns to attic plenum P of house 112 via vent V within house and is drawn back into thermal cladding structure 114 through return vent 132. In some embodiments, supply vent 130 and return vent 132 can include thermostatically-controlled fans.

For example, solar-heated air having a temperature of 80 degrees Fahrenheit to 120 degrees Fahrenheit is supplied to furnace F via supply vent 130 from solar thermal cladding structure 114. The solar-heated air passes through furnace F and is distributed by the ductwork of house 112. Cooler air returns to attic plenum P and is drawn back into solar thermal cladding structure 114 via return vent 132. Heating system 110 is a forced-air system that allows for greater heat distribution throughout house 112.

Figure 6B:
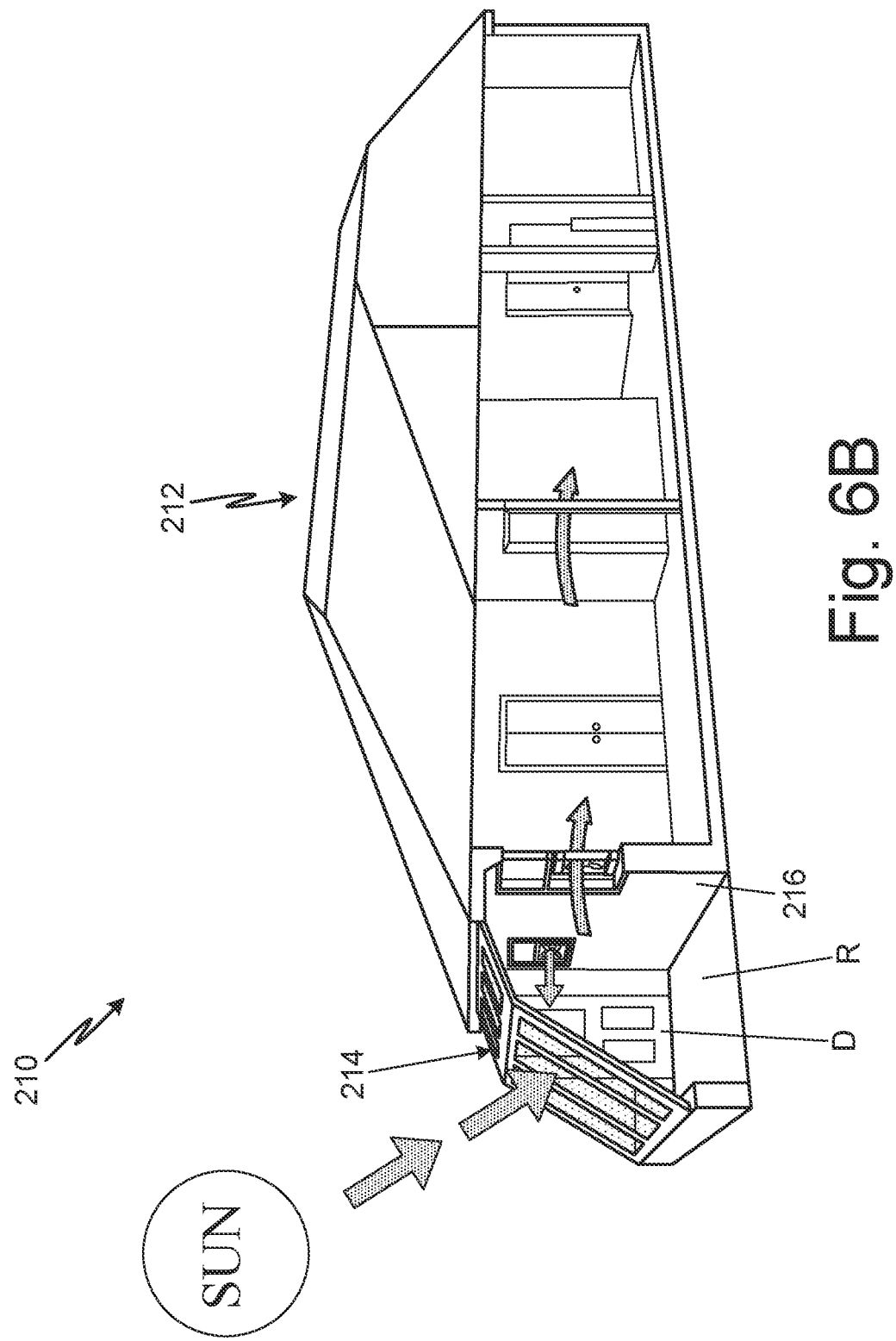
FIG. 6B is sectional perspective view of the heating system of the house and the solar thermal cladding structure of FIG. 6A.

FIG. 6A is an elevation view of heating system 210 of house 212 with solar thermal cladding structure 214 mounted on exterior wall 216 of house 212. FIG. 6B is sectional perspective view of heating system 210 of house 212 and solar thermal cladding structure 214 of FIG. 6A. Heating system 210 includes house 212 and solar thermal cladding structure 214. House 212 includes exterior wall 216.

Heating system 210 has the same structure and function as heating system 10 described with respect to FIGS. 1A-4. However, heating system 210 has one-story house 212 and solar thermal cladding structure 214 is shaped and mounted to exterior wall 216 to form a room R between exterior wall 216 and solar thermal cladding structure 214. An upper portion of solar thermal cladding structure 214 is mounted to exterior wall 216 to house 112. A lower portion of solar thermal cladding structure 214 is attached to foundation F that is a spaced distance from exterior wall such that room R is formed.

Solar thermal cladding structure 214 collects solar thermal radiation and circulates heated air into the room R. As such, solar thermal cladding structure 214 is shaped to create room R, which may be a sunroom. A door D may be provided to enter and exit room R. Solar heated air is circulated from room R into and throughout an interior of house 112. Cooler air returns to solar thermal cladding structure 214.

Figure 7A:
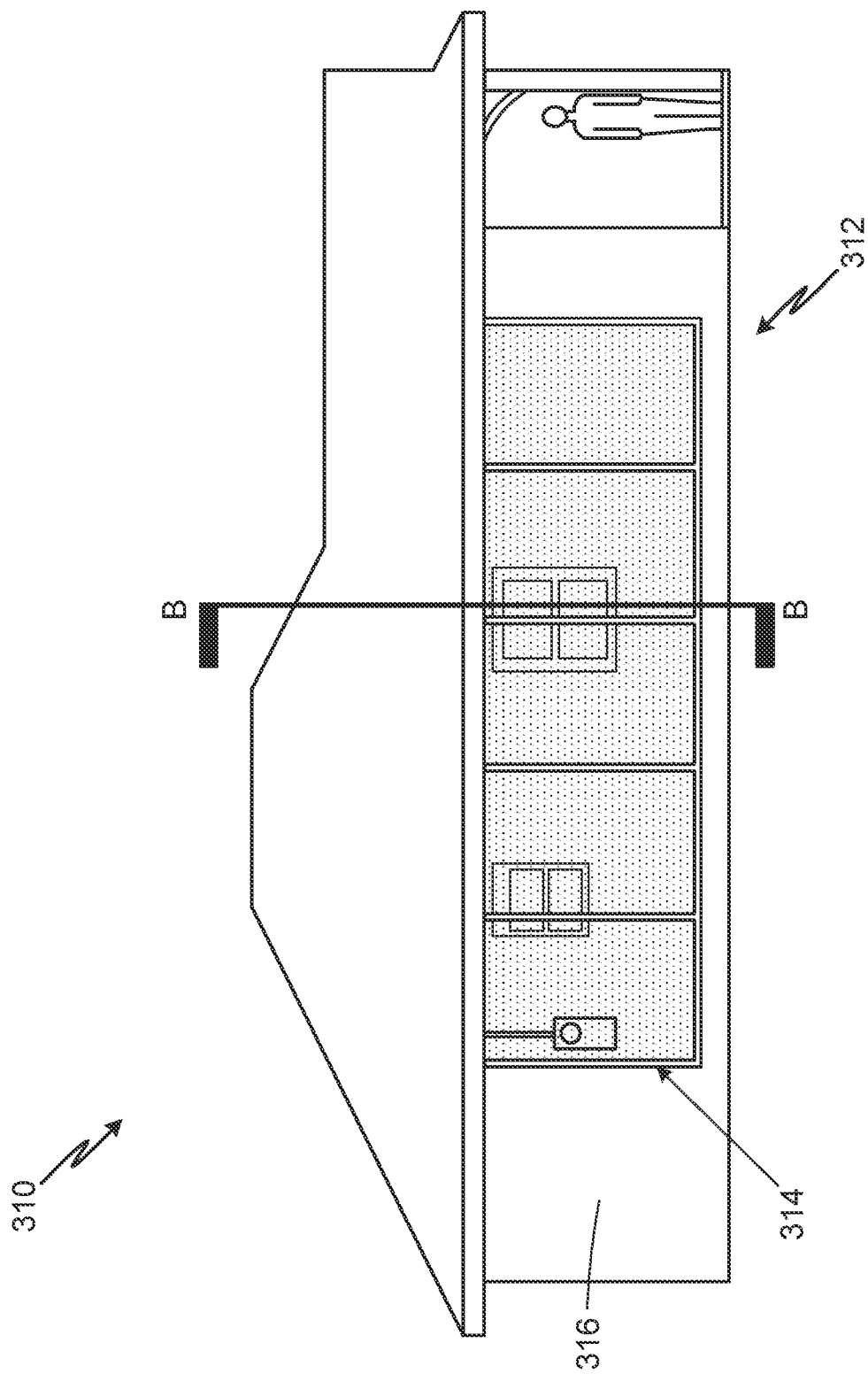
FIG. 7A is an elevation view of a heating system of a house with a solar thermal cladding structure mounted on an exterior wall of the house.

FIG. 7A is an elevation view of heating system 310 of house 312 with solar thermal cladding structure 314 mounted on exterior wall 316 of house 312. FIG. 7B is sectional perspective view of heating system 314 of house 312 and solar thermal cladding structure 314 of FIG. 7A. Heating system 310 includes house 312 and solar thermal cladding structure 314. House 312 includes exterior wall 316.

Heating system 310 has the same structure and function as heating system 10 described with respect to FIGS. 1A-4. However, heating system 310 has one-story house 312. Solar thermal cladding structure 314 is mounted on sunny-side exterior wall 316 of house 312. Like other embodiments shown, solar thermal cladding structure 314 collects solar thermal radiation and circulates heated air into one-story house 312. Solar thermal cladding structure 314 creates a smaller footprint than solar thermal cladding structure 214 mounted on one-story house 212, as shown in FIGS. 6A and 6B.

Figure 8:
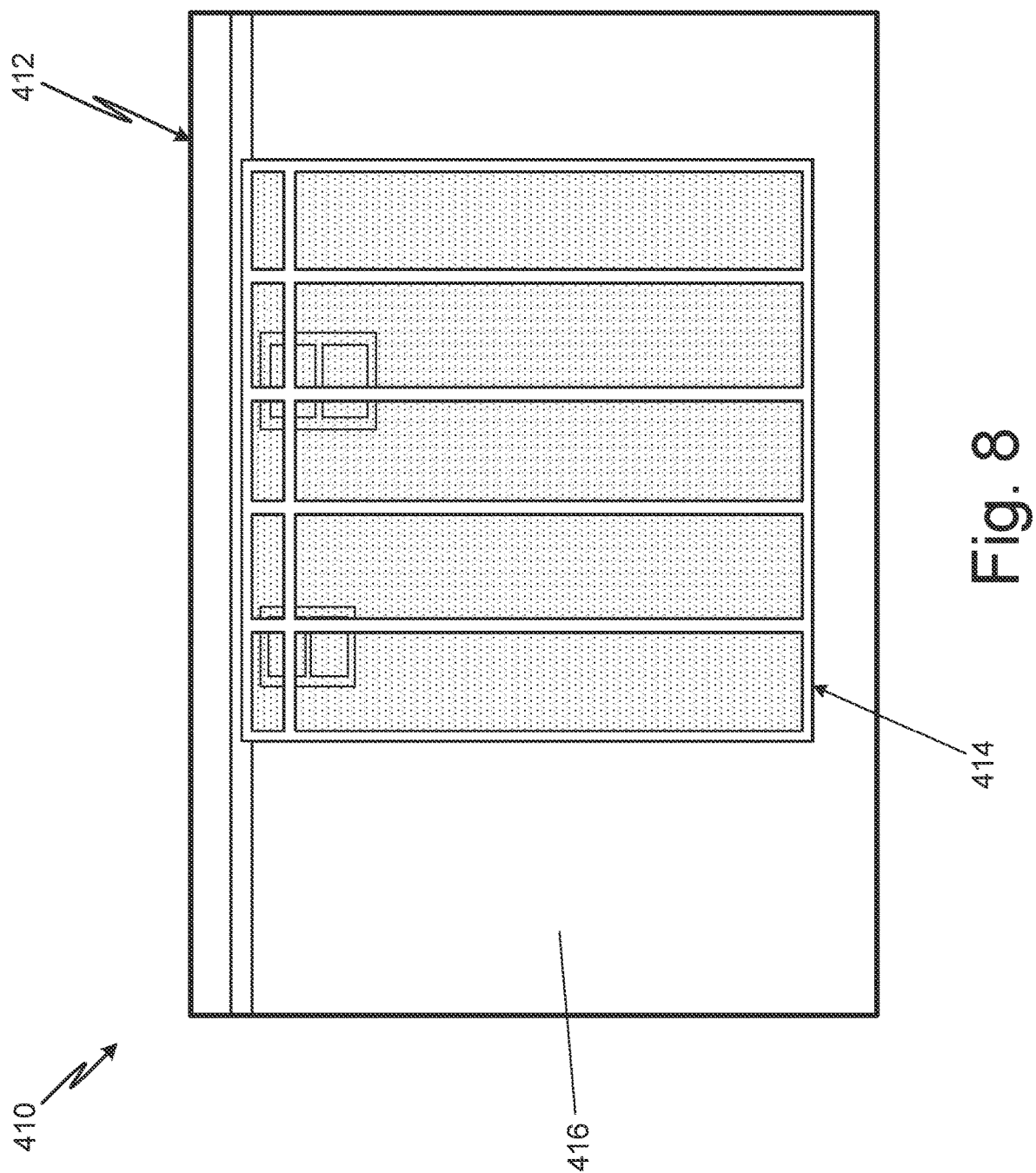
FIG. 8 is an elevation view of a heating system of a building with a solar thermal cladding structure mounted on an exterior wall of the building.
Figure 10A:
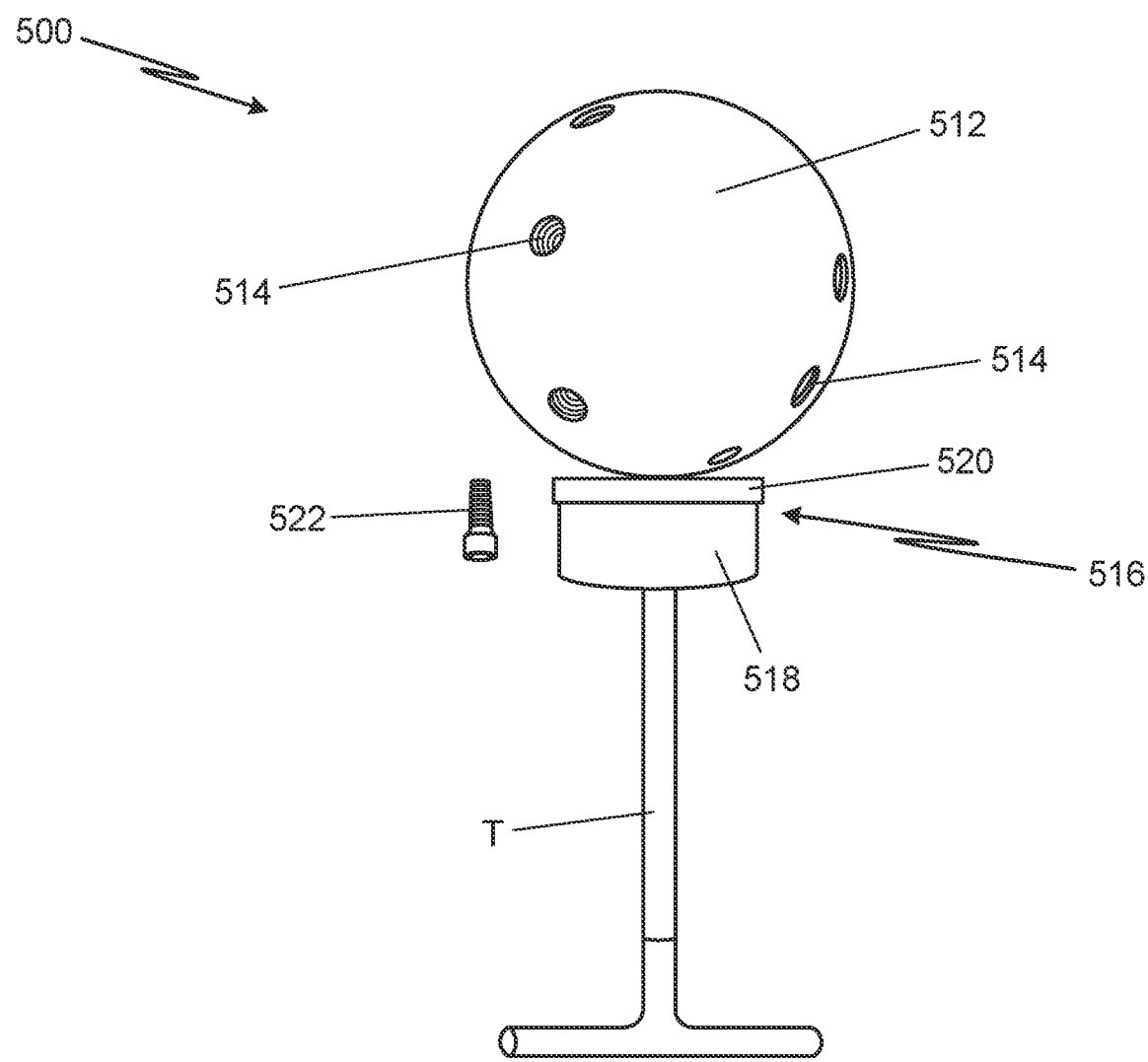
FIG. 10A is a first photo in a series of photos illustrating a progression of assembly of the connector and the beam strut.
Figure 10B:
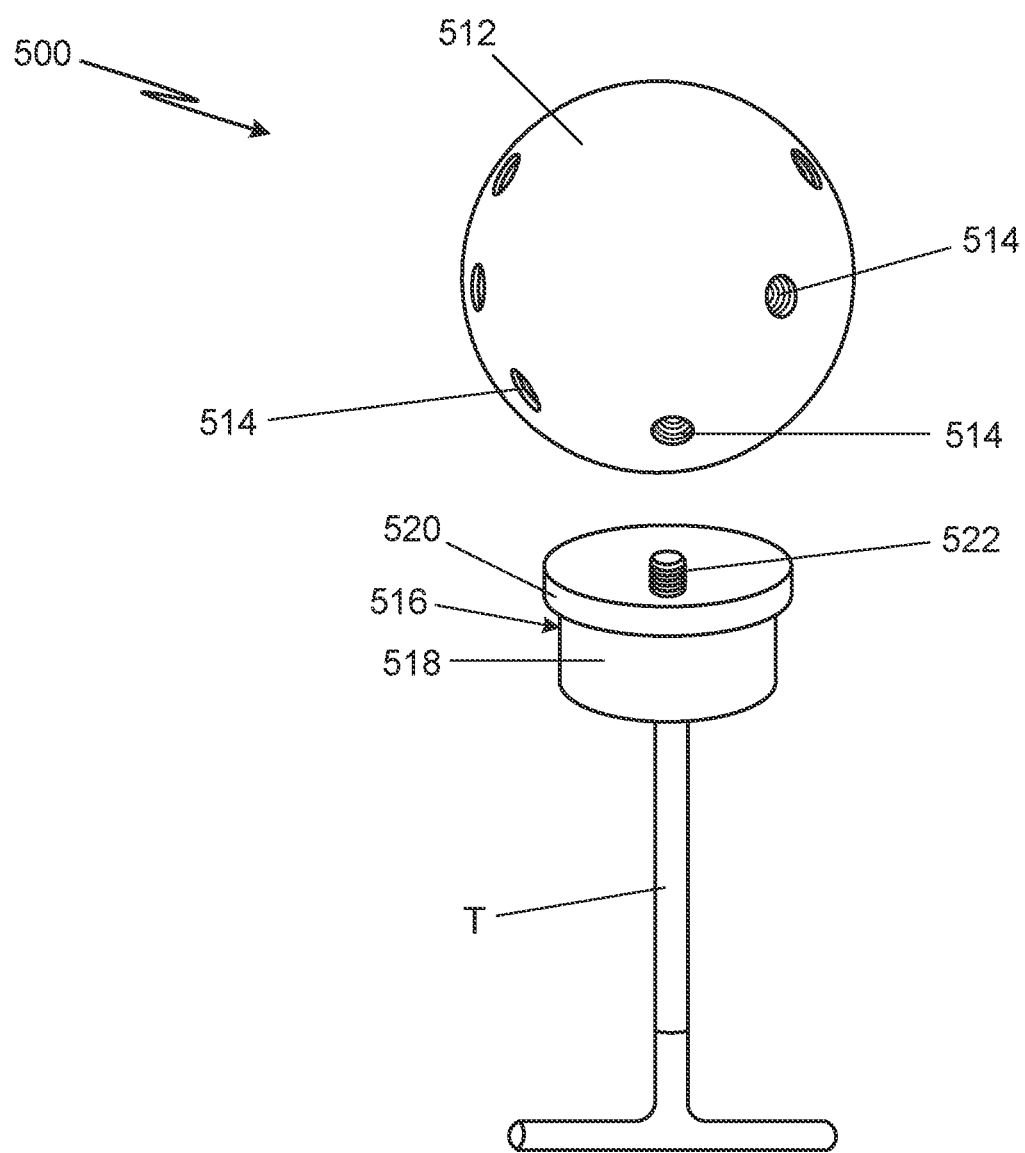
FIG. 10B is a second photo in a series of photos illustrating the progression of assembly of the connector and beam strut.
Figure 10C:
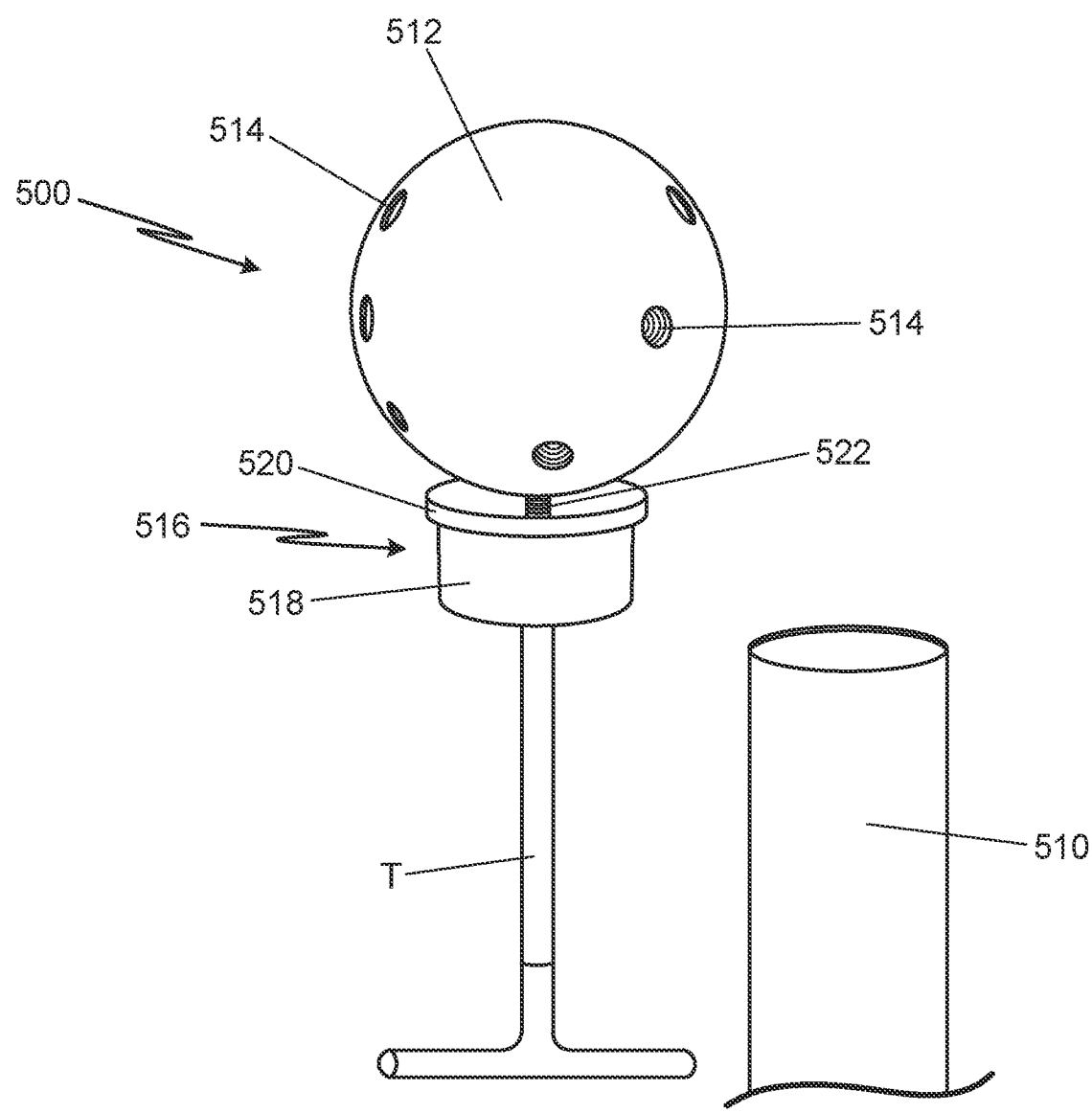
FIG. 10C is a third photo in a series of photos illustrating the progression of assembly of the connector and beam strut.
Figure 10D:
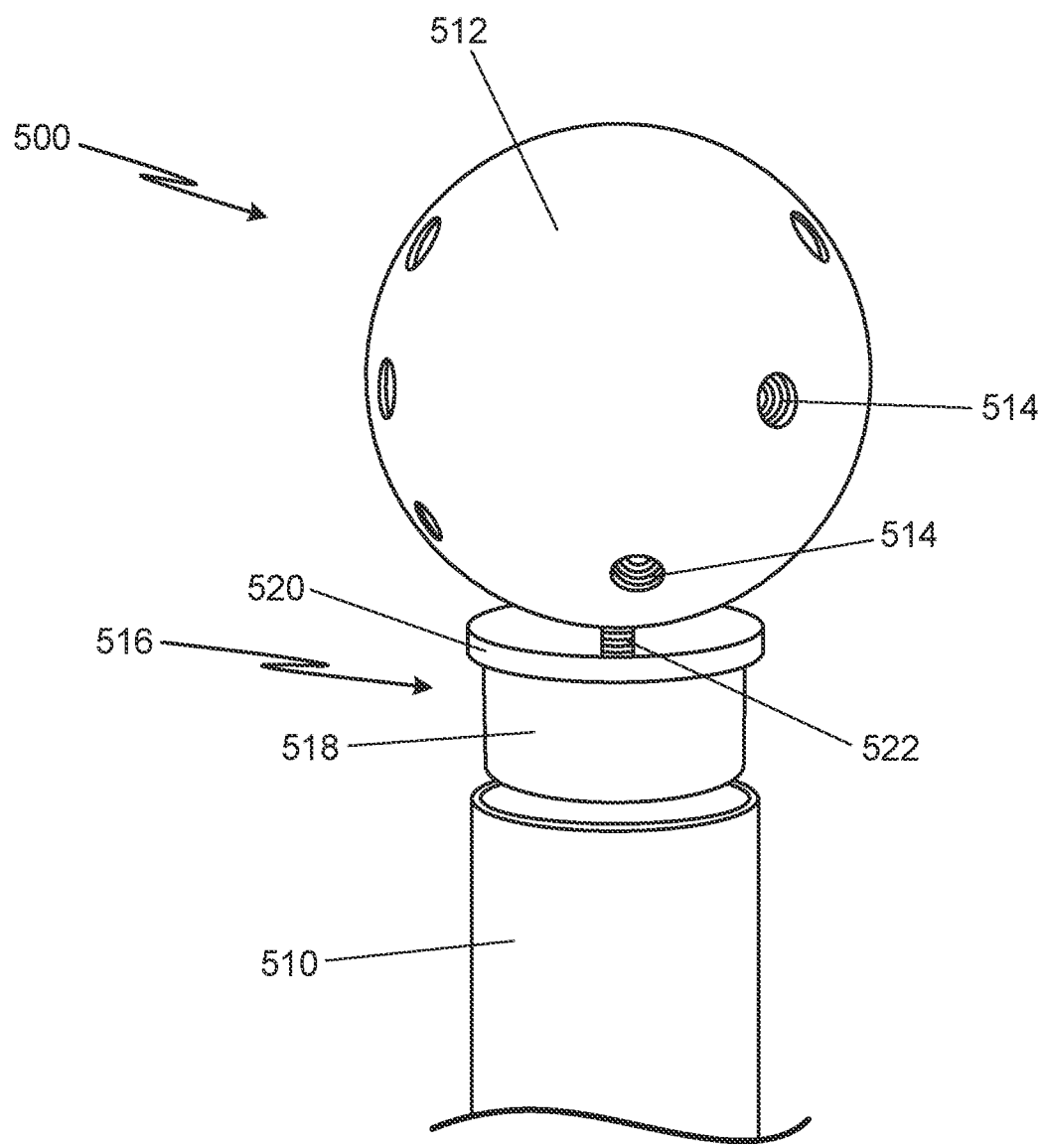
FIG. 10D is a fourth photo in a series of photos illustrating the progression of progression of assembly of the connector and beam strut.

FIG. 8 is an elevation view of heating system 410 of building 412 with a solar thermal cladding structure 414 mounted on exterior wall 416 of building 412. Heating system 410 includes house 412 and solar thermal cladding structure 414. House 412 includes exterior wall 316.

Heating system 410 has the same structure and function as heating system 10 described with respect to FIGS. 1A-4. However, heating system 410 has building 412. Building 412 may be a large building, such as a big box store, a warehouse, an auditorium, or a gymnasium. Solar thermal cladding structure 414 is mounted on sunny-side exterior wall 416 of building 412. Solar thermal cladding structure can start a distance off the ground, such as 10 feet off the ground, to accommodate building access doors and can extend up 20 feet to the flat roof line. As in the other embodiments shown, solar thermal cladding structure 414 collects solar thermal radiation and circulates heated air into building 412. As such, the collected solar heated air that normally "washes off" building 412 is circulated into the ductwork and HVAC system of building 412. The solar air flow rate within building 412 can be controlled by an HVAC microprocessor that integrates and balances the solar air by replacing the fossil fuel heated air, reducing carbon dioxide pollution.

As building 412 encloses a large area that requires heat, solar thermal cladding structure 414 provides a considerable reduction in the amount of non-solar power needed to heat building 412, thereby greatly reducing carbon dioxide emissions associated with heating. For example, building 412 may be a 50,000 square-foot big box store that requires an estimated 3,000,000 BTUs in heating per day. Between 30 percent and 60 percent of the 3,000,000 BTU natural gas heating requirements of building 412 can be provided by solar, depending on when the heat is used, the insulation value of building 412, and the use characteristics of building 412. Thus, when solar thermal cladding structure 414 is installed on sunny exterior wall 416 of building 412, the solar heat collected can be exceedingly cost-effective and environmentally advantageous.

FIG. 9A is a perspective view of connectors 500 that are used to connect beam struts 510 together. FIG. 9B is a perspective top view inserts 516 of connectors 500 that are used to connect beam struts 510 together. FIG. 9C is a perspective bottom view of inserts 516 of connectors 500 that are used to connect beam struts 510 together. FIGS. 10A-10D are a series of photos illustrating a progression of assembly of connector 500 and beam strut 510. FIGS. 9A-10D will be discussed together.

Connector 500 includes ball 512 having threaded holes 514 and insert 516. Insert 516 includes cylindrical portion 518, flange 520, and screw 522.

Connector 500 is used to connect beam struts 510. A connector 500 may be connected to one or more beam struts 510 (which have the same structure and function as beam struts 36 described above with respect to FIGS. 1A-4). Connectors 500 are connected to various beam struts 510 to form a frame, such as frame 18, of a solar thermal cladding structure 14, 114, 214, 314, or 414, as described above. Connector 500 is an alternative to connector 34A and connector 34B shown above in FIG. 4. Various connectors 34A, 34B, and 500 may be used to form a single frame 18.

Connector 500 has spherical ball 512 that includes a plurality of threaded holes 514. Ball 512 may have a 3-inch diameter. Threaded holes 514 are positioned throughout ball 512. Insert 516 is connected to ball 512 via one of threaded holes 514. One or more inserts 516 may be connected to spherical ball 512.

Insert 516 includes cylindrical portion 518 that is sized to fit within beam strut 510 to form an interference fit between insert 516 and beam strut 510. Flange 520 is connected to an end of cylindrical portion 518. Flange 520 abuts ball 512 when insert 516 is fully attached to ball 512. Screw 522 is connected to flange 520 opposite cylindrical portion 518.

Screw 522 is sized and shaped to engage and mate with threaded holes 514 of ball 512 to attached insert 516 to ball 512.

FIGS. 10A-10D show a progression of assembly of connector 500. Ball 512 is attached to insert 516 via screw 522. Screw 522 is threaded into threaded hole 514 of ball 512 via tool T. Tool T is inserted into insert 516 at the open end of cylindrical portion 518, which is opposite flange 520, and turned to engage screw 522 with threaded hole 514 of ball 512. When screw 522 is fully threaded into ball 512, flange 520 abuts ball 512, and tool T is removed from insert 516. Once connector 500 is assembled, beam strut 510 is pushed onto cylindrical portion 518 of insert 516 until cylindrical portion 518 is fully within beam strut 510 and beam strut 510 abuts flange 520. As such, insert 516 connects beam strut 510 to ball 512. Cylindrical portion 518 has an interference fit with beam strut 510. One or more inserts 516 may be connected to ball 512 of connector 500 such that one or more beam struts 510 may be connected to connector 500. Connector 500 connects beam struts 510 to each other.

The placement of threaded holes 514 along ball 512 allows for varying placement of inserts 516 along ball 512 such that beam struts 510 may be placed at different angles. As such, connector 500 offers different options for angles of beam struts 510 when forming frame 18. For example, FIG. 9A shows two alternative options for connecting beams segments 510 to connectors 500. As a result, beam struts 510 can be connected to connectors 500 at any angle required by the desired shapes of various frames 18 of solar thermal cladding structures 14, 114, 214, 314, or 414, and the same connectors 500 can be utilized.

The solar thermal cladding structures, such as solar thermal cladding structures 14, 114, 214, 314, or 414, are retrofit heating systems for houses or apartments and commercial buildings as they can be configured to mount on any wall or roof. Solar thermal cladding structures 14, 114, 214, 314, and 414 convert the house or building area into a passive solar collector using the house or building itself as the solar absorber.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A solar thermal cladding structure comprising:
a frame comprising:
a plurality of connectors; and
a plurality of beam struts;
wherein the plurality of connectors connect the plurality of beam struts together;
a membrane extending along the frame, the membrane having a first layer and a second layer;
an inflation blower connected to the membrane and in fluid communication with a space between the first layer and the second layer of the membrane;
a perimeter frame upper locking extrusion connected to an upper portion of a perimeter of the membrane and the frame and a perimeter frame lower locking extrusion connected to a lower portion of the perimeter the membrane and the frame, wherein the perimeter frame upper locking extrusion and the perimeter frame lower locking extrusion are configured to hold and seal the membrane to a house or building; and
wherein a connector of the plurality of connectors comprises:
a ball having a plurality of threaded holes; and
an insert comprising:
a cylindrical portion sized to fit within a beam strut of the plurality of beam struts;
a flange connected to the end of the cylindrical portion; and
a screw connected to the flange opposite the cylindrical portion, the screw configured to engage with the threaded holes of the ball.

2. The solar thermal cladding structure of claim 1, wherein the solar thermal cladding structure is configured to mount to a house or building at an exterior wall or roof that is exposed to direct sunlight.

3. The solar thermal cladding structure of claim 1, wherein one or more of the plurality of beam struts are configured to connect to one of the plurality of connectors at various angles.

4. The solar thermal cladding structure of claim 1, wherein each beam strut of the plurality of beam struts is a tubular extruded aluminum strut having a 2-inch diameter.

5. The solar thermal cladding structure of claim 1, wherein the inflation blower is configured to inflate the membrane to create a bubble.

6. The solar thermal cladding structure of claim 1, wherein the solar thermal cladding structure collects solar thermal radiation.

7. The solar thermal cladding structure of claim 1, wherein the solar thermal cladding structure collects solar thermal radiation.

8. The solar thermal cladding structure of claim 1, wherein membrane locking inserts connect the membrane to the perimeter frame upper locking extrusion and the perimeter frame lower locking extrusion.

9. The solar thermal cladding structure of claim 1, wherein the plurality of threaded holes are placed along the ball to allow for varying placement of the inserts along the ball such that the plurality of beam struts may be placed at different angles.

10. The solar thermal cladding structure of claim 1, wherein each beam strut of the plurality of beam struts is connected to the insert of the connector.

11. The solar thermal cladding structure of claim 1, wherein the ball has a 3-inch diameter.

12. A solar thermal cladding structure comprising:
a frame;
a plurality of beam struts;
a plurality of connectors that connect the plurality of beam struts together;
a membrane extending along the frame, the membrane having a first layer and a second layer; and
an inflation blower connected to the membrane and in fluid communication with a space between the first layer and the second layer of the membrane;
a perimeter frame upper locking extrusion connected to an upper portion of a perimeter of the membrane and the frame and a perimeter frame lower locking extrusion connected to a lower portion of the perimeter, the membrane, and the frame, wherein the perimeter frame upper locking extrusion and the perimeter frame lower locking extrusion are configured to hold and seal the membrane to the house or building;

wherein a connector of the plurality of connectors comprises:
a ball having a plurality of threaded holes; and
an insert comprising:
a cylindrical portion sized to fit within a beam strut of the plurality of beam struts;
a flange connected to the end of the cylindrical portion; and
a screw connected to the flange opposite the cylindrical portion, the screw configured to engage with the threaded holes of the ball; and wherein the solar thermal cladding structure is configured to mount to a house or building at an exterior wall or roof that is exposed to direct sunlight and to collect solar thermal radiation to heat the house or building.

13. The solar thermal cladding structure of claim 12, wherein one or more of the plurality of beam struts are configured to connect to one of the plurality of connectors at various angles.

14. The solar thermal cladding structure of claim 12, wherein the plurality of threaded holes are placed along the ball to allow for varying placement of the inserts along the ball such that the plurality of beam struts may be placed at different angles.

15. The solar thermal cladding structure of claim 12, wherein the plurality of threaded holes are placed along the ball to allow for varying placement of the inserts along the ball such that the plurality of beam struts may be placed at different angles.

\* \* \* \* \*